United States Patent
Sakamoto et al.

(10) Patent No.: US 7,803,079 B2
(45) Date of Patent: Sep. 28, 2010

(54) POWER TRANSMISSION APPARATUS FABRICATION METHOD AND POWER TRANSMISSION APPARATUS FABRICATED BY THE METHOD

(75) Inventors: Hiroyasu Sakamoto, Obu (JP); Naoto Agata, Toyoake (JP); Hideo Kuroda, Nishio (JP); Toshio Kamio, Gamagori (JP); Souhei Komiyama, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 12/081,872

(22) Filed: Apr. 22, 2008

(65) Prior Publication Data

US 2008/0268995 A1  Oct. 30, 2008

(30) Foreign Application Priority Data

Apr. 26, 2007 (JP) .............................. 2007-117259

(51) Int. Cl.
*F16H 7/20* (2006.01)
*F16H 55/36* (2006.01)
*B21K 1/02* (2006.01)

(52) U.S. Cl. ................... 474/199; 29/898.08; 29/893.1; 29/895.21; 384/417

(58) Field of Classification Search ................. 474/199; 384/537; 29/898.07, 898.08; 72/469
See application file for complete search history.

(56) References Cited

U.S. PATENT DOCUMENTS

| | | | | |
|---|---|---|---|---|
| 2,025,223 A | * | 12/1935 | Watson | 285/189 |
| 2,881,646 A | * | 4/1959 | Farr et al. | 29/243.5 |
| 4,125,298 A | * | 11/1978 | Heurich et al. | 384/537 |
| 4,574,448 A | * | 3/1986 | Brandenstein et al. | 29/283.5 |
| 4,587,833 A | * | 5/1986 | Speakman | 72/466.8 |
| 6,129,455 A | * | 10/2000 | Galante | 384/537 |
| 6,935,026 B2 | * | 8/2005 | Frantzen | 29/898.07 |
| 2003/0103704 A1 | * | 6/2003 | Nieman et al. | 384/537 |
| 2003/0115755 A1 | | 6/2003 | Frantzen | |
| 2005/0143208 A1 | | 6/2005 | Ozawa et al. | |
| 2006/0089201 A1 | | 4/2006 | Nosaka et al. | |

FOREIGN PATENT DOCUMENTS

| | | |
|---|---|---|
| JP | U-06-28424 | 4/1994 |
| JP | A-2003-194079 | 7/2003 |
| JP | A-2005-188638 | 7/2005 |
| JP | A 2006-153258 | 6/2006 |

OTHER PUBLICATIONS

Office Action dated Feb. 24, 2009 in corresponding Japanese patent application No. 2007-117259 (and English translation).

* cited by examiner

*Primary Examiner*—John Q Nguyen
*Assistant Examiner*—Robert T Reese
(74) *Attorney, Agent, or Firm*—Posz Law Group, PLC (57) ABSTRACT

A power transmission apparatus is disclosed. A pulley is journalled through a ball bearing on the outer periphery of a bearing support portion arranged on a housing, and a metal ring is fitted on the inner periphery of the pulley. The outer ring of the ball bearing is press-fitted into the inner periphery of the metal ring, and a punch is forcibly pushed into a front-side end surface of the ring. In this way, punched holes each having a sectional area progressively increased from the rear to front side are formed, and the portions of the metal ring near to the inner periphery than the punched holes are pushed out and caulked. Thus, caulked portions are formed to fixedly caulk the outer ring.

13 Claims, 9 Drawing Sheets

POWER TRANSMISSION APPARATUS FABRICATION METHOD AND POWER TRANSMISSION APPARATUS FABRICATED BY THE METHOD

BACKGROUND OF THE INVENTION

1. Field of the Invention

This invention relates to a fabrication method of a power transmission apparatus having a rolling bearing journaling a wheel to which power from a drive source is transmitted, and the power transmission apparatus fabricated by the method.

2. Description of the Related Art

Generally, a compressor for the car air-conditioner transmits power from an external power source, such as an engine through a belt, a pulley, etc. Between the belt and the input shaft of the compressor, a power transmission apparatus capable of shutting off the power is disposed in case excessive torque is generated.

Figure 9:
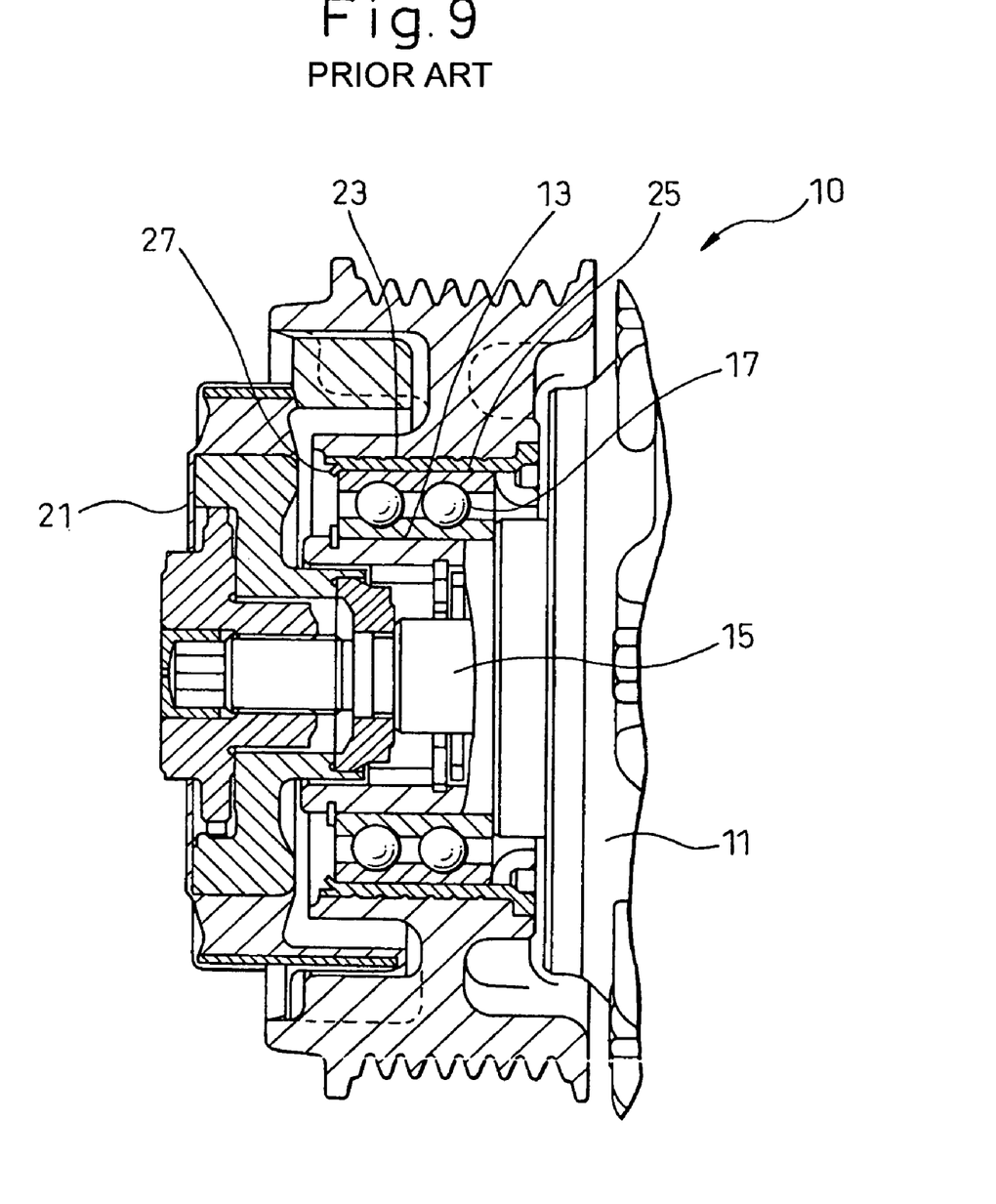
FIG. 9 is a longitudinal sectional view showing the conventional power transmission apparatus caulked by punching.

A power transmission apparatus 10 of this type, as shown in FIG. 9, includes a cylindrical bearing support portion 13 projected from a compressor housing 11, an input shaft 15 journalled on the inside of bearing support portion 13, a synthetic resin pulley 19 journalled on the outer periphery of bearing support portion 13 through a ball bearing 17 and rotationally driven by a drive source, and a power transmission device 21 interposed between pulley 19 and input shaft 15 to couple pulley 19 and input shaft 15 to each other, wherein a cylindrical metal ring 23 is fitted on the inner periphery of pulley 19. An outer ring 25 of ball bearing 17 is press-fitted into the inner periphery of metal ring 23, and fixed by caulking at six points 27 equidistantly in the peripheral direction on a front-side end surface 23a of metal ring 23.

Figure 10:
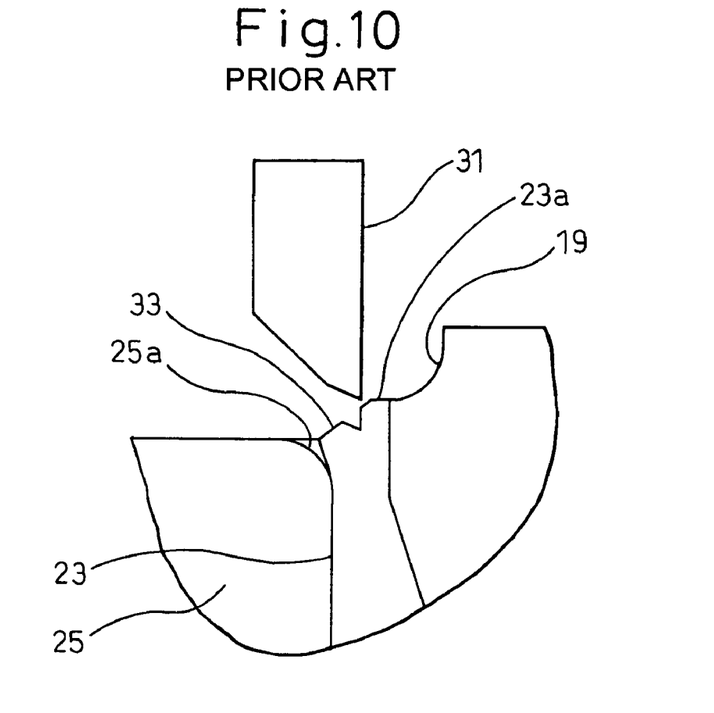
FIG. 10 is a sectional view showing the conventional method of caulking by punching.
Figure 11:
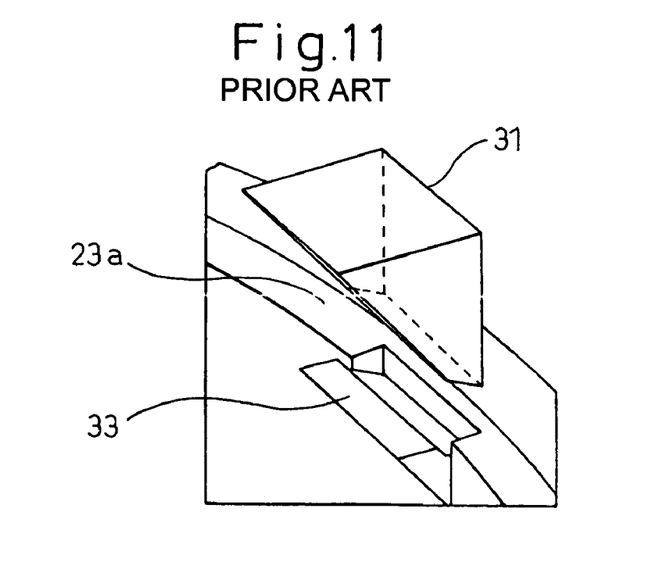
FIG. 11 is a perspective view showing the conventional method of caulking by punching.

Punch-caulked points 27 are formed using a punch 31 as shown in FIGS. 10 and 11. Punch 31 is a wedge-shaped tool having a predetermined peripheral width. The forward end of punch 31 is driven into front-side end surface 23a of metal ring 23 and the inner peripheral portion of front-side end surface 23a is pushed out radially inward thereby forming a protrusion 33. Protrusion 33 engages a front-side outer peripheral portion 25a of outer ring 25, and thus prevents ball bearing 17 from coming out toward the front side.

However, in the conventional method of caulking the ball bearing, protrusion 33 fails to positively press front-side outer peripheral portion 25a of outer ring 25, and therefore once the press-fitting of outer ring 25 on metal ring 23 is loosened, outer ring 25 may become displaced rearward and pulley 19 interfere with housing 11. Even if the press-fitting state is not loosened, pulley 19 may become displaced under a large force, which may be exerted in the axial direction on pulley 19.

To cope with this situation, a method is considered in which punch 31 is pushed into a further depth in the axial direction in order that protrusion 33 is positively pressed against front-side outer peripheral portion 25a of outer ring 25.

Figure 12:
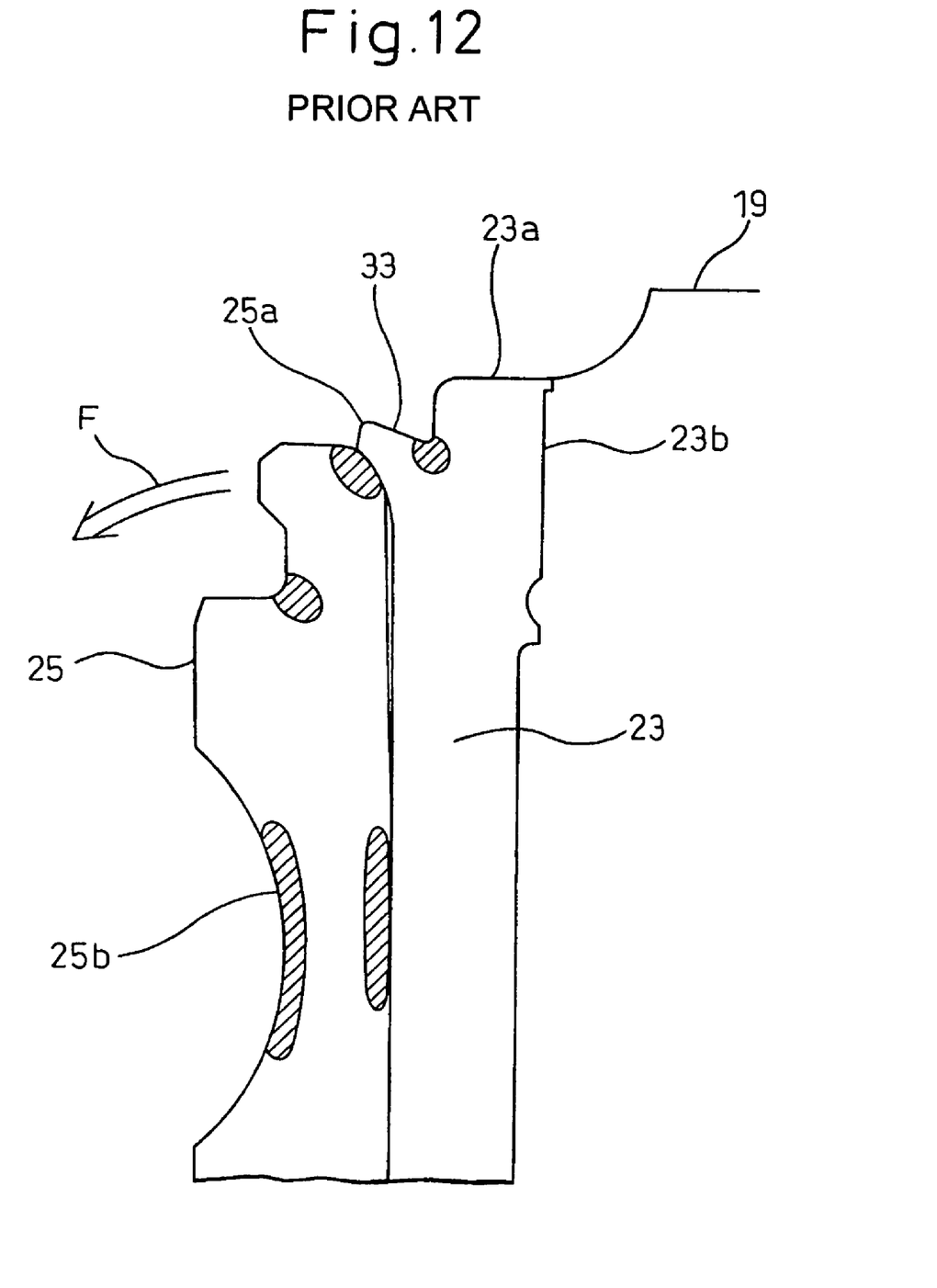
FIG. 12 is a sectional view indicating the problem posed by the outer ring of the ball bearing in the conventional method in which the punching depth is increased in caulking.

However, with this configuration, the base of protrusion 33 presses outer ring 25 excessively, as shown in FIG. 12, which results in a radially inward force being exerted on front-side outer peripheral portion 25a of outer ring 25, which is then subjected to a bending stress F. As a result, compressive stress is exerted on a ball track surface 25b of outer ring 25, and the roundness of the track surface is adversely affected. In view of the fact that front-side end portion 23b of metal ring 23 is expanded radially outward, synthetic resin pulley 19 may become deformed and cracked.

Japanese Unexamined Patent Publication No. 2006-153258 discloses a power transmission apparatus in which a wheel with power transmitted thereto from a drive source is journalled by a ball bearing, and a power transmission device is interposed between the wheel and the input shaft of the compressor to shut off the power in case an excessive torque is generated.

SUMMARY OF THE INVENTION

The object of this invention is to solve the above-mentioned problem and provide a fabrication method of a power transmission apparatus capable of preventing the displacement of a pulley while at the same time maintaining a satisfactory roundness of the bearing track surface and the power transmission apparatus fabricated by the method.

In order to solve the aforementioned problem, a power transmission apparatus, is provided comprising a bearing support portion (44) arranged on a driven unit (43), an input shaft (49) arranged inside bearing support portion (44), a wheel (47) journalled on the outer periphery of bearing support portion (44) through a rolling bearing (45) and rotationally driven by a drive source, and a power transmission device (85) interposed between wheel (47) and input shaft (49) for coupling wheel (47) and input shaft (49) to each other, wherein a cylindrical metal ring (97) is fitted on the inner periphery of wheel (47), wherein an outer ring (93) of rolling bearing (45) is press-fitted into the inner periphery of metal ring (97) and punched holes (101) having a progressively increased cross-sectional area from rear to front side are formed by pushing a punch (103) rearward into a front-side end surface (97a) of metal ring (97), while the part of metal ring (97) nearer to the inner periphery than punch (103) is pushed out radially inward thereby to form a plurality of caulked portions (105) and fixedly caulk outer ring (93).

With this means, the amount of radially inward plastic deformation of metal ring (97) is small in the neighborhood of the small-diameter forward end of punch (103), i.e. in the neighborhood of the bottom of punched hole (101). Thus, outer ring (93) is not excessively pressed, and the roundness of a ball track surface (93b) is not adversely affected by the bending stress exerted on outer ring (93). On the other hand, the amount of radially inward plastic deformation of metal ring (97) is large in the neighborhood of the large-diameter rear end portion of punch (103), i.e. in the neighborhood of the open edge of each punched hole (101). As a result, front-side outer peripheral portion (93a) of outer ring (93) can be deeply engaged and caulked, thereby preventing the axial displacement of outer ring (93).

In order to solve the aforementioned problem, wheel (47) is formed of synthetic resin, and the portion of punch (103) nearer to rolling bearing (45) along longitudinal axis (Q) has a conical surface (103b) with the radius from longitudinal axis (Q) progressively increased from rear to front side, while the portion of punch (103) nearer to wheel (47) along longitudinal axis (Q) includes a side surface (103a). In the case where wheel (47) is formed of a synthetic resin, the portion of punch (103) nearer to wheel (47) side thereof on longitudinal axis (Q) is formed with a right flat surface along longitudinal axis (Q). The portion of metal ring (97) nearer to wheel (47) than punch (103) is not substantially deformed, and therefore wheel (47) of synthetic resin is prevented from being cracked. In view of the fact that a conical surface with the radius from longitudinal axis (Q) progressively increased from rear to front side is formed on the outer ring (93) side, the portion of metal ring (97) nearer to outer ring (93) than punch (103) can be deformed in both peripheral directions. Even if punch (103) is pushed into the depth somewhat excessively, the metal portion can be relieved in the peripheral direction, with the result that the roundness of the ball track surface is not adversely affected by excessive pressure which may be imparted on the outer ring.

In order to solve the aforementioned problem, the caulked portions can be formed by punch (103) at equal angular intervals of 30 degrees on front-side end surface (97a) of metal ring (97). Thus, front-side outer peripheral portion (93a) of outer ring (93) can be uniformly caulked in peripheral direction, thereby preventing the roundness of the ball track surface from being adversely affected.

In order to solve the aforementioned problem, surface (103b) of punch (103) can be a part of either a circular conical surface or a pyramidal surface. Therefore, various configurations can be employed and fabrication facilitated.

In order to solve the aforementioned problem, longitudinal axis (Q) of conical surface (103b) of punch (103) can be located within the range of 0.3 mm to 0.5 mm from the inner peripheral surface of metal ring (97) radially outward. The peripheral length of each punched hole (101) by punch (103) can be set within the range of 1.2 mm to 1.6 mm.

The reference numerals inserted in the parentheses attached to the names of the respective means above designate an example of correspondence with the specific means described in the embodiments below.

The present invention may be more fully understood from the description of preferred embodiments of the invention, as set forth below, together with the accompanying drawings.

DESCRIPTION OF THE PREFERRED EMBODIMENTS

The embodiments of the invention are described below with reference to FIGS. 1 to 8.

Figure 1:
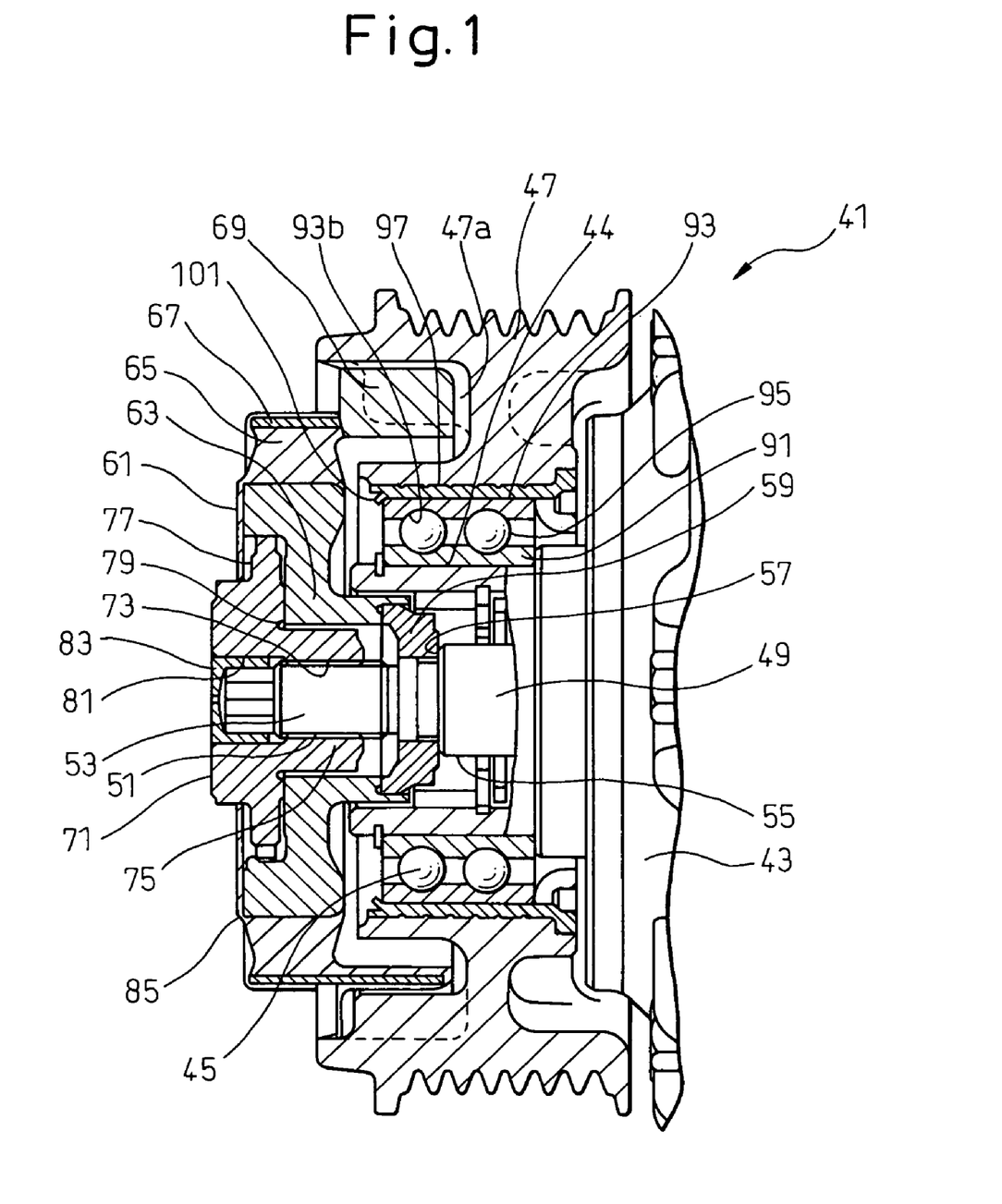
FIG. 1 is a longitudinal sectional view showing a power transmission apparatus according to an embodiment of the invention.

FIG. 1 shows a power transmission apparatus 41 according to an embodiment of the invention.

Power transmission apparatus 41 has a compressor housing 43. Housing 43 includes a cylindrical bearing support portion 44 projected toward the front side. A synthetic resin pulley 47 is rotatably arranged on the outer periphery of bearing support portion 44 through a ball bearing 45. Inside bearing support portion 44, a input shaft 49 which is pivotally supported is projected toward the front side. Input shaft 49 includes a front-side small-diameter portion 53 formed with a externally threaded portion 51, a rear-side large-diameter portion 55 and a stepped portion 57 formed between small-diameter portion 53 and large-diameter portion 55. An annular washer 59 is fitted on stepped portion 57 of input shaft 49, and an annular hub 61 is abutted against washer 59.

Hub 61 includes an inner hub 63 fitted in contact with washer 59, a cylindrical portion 65 of an elastic material such as rubber formed in a ring on the outer periphery of inner hub 63, a cylindrical outer ring 67 arranged on the outer periphery of cylindrical portion 65 and a hub-side engaging portion 69 formed on the outer periphery of outer ring 67 and engaging an engaging portion 47a of pulley 47.

Externally threaded portion 51 of input shaft 49 is screwed with a power shutoff member 71. Power shutoff member 71 includes a cylindrical portion 75 having an internally threaded portion 73 on the inner periphery thereof screwed with externally threaded portion 51, a flange portion 77 increased in diameter outward from the front side of cylindrical portion 75, and a breakdown region 79 formed between cylindrical portion 75 and flange portion 77. Power shutoff member 71 is fastened by being screwed to externally threaded portion 51, and flange portion 77 presses inner hub 63 against washer 59, so that hub 61 is fixedly pressed against stepped portion 57 through washer 59. A hole 81 communicating with the inner periphery of cylindrical portion 75 is formed at the central part on the front side of power shutoff member 71. Hole 81 has a synthetic resin cap 83 press-fitted therein for preventing intrusion of foreign matter, dust and dirt, water, etc. into internally threaded portion 73 formed on the inner periphery of cylindrical portion 75.

Hub 61 and power shutoff member 71 make up a power transmission means 85.

In this configuration, the normal operation is performed in such a manner that the rotational torque input from pulley 47 is transmitted to hub 61 through pulley-side engaging portion 47a and hub-side engaging portion 69 in engagement with each other, and the torque transmitted to hub 61 is transmitted to input shaft 49 through washer 59 thereby to drive the compressor.

In the event that the compressor seizes and input shaft 49 is locked, excessive torque is generated between input shaft 49 and hub 61, which causes washer 59 and stepped portion 57 to slide with each other, so that internally threaded portion 73 of power shutoff member 71 and externally threaded portion 51 of input shaft 49 rotate relative to each other. This relative rotation applies a large force to separate cylindrical portion 75 of power shutoff member 71 in the direction away from flange portion 77, with the result that breakdown region 79 is broken. This breakdown extinguishes the force of power shutoff member 71 to press inner hub 63 toward washer 59, and the torque transmission from hub 61 to input shaft 49 is shut off.

In this power transmission apparatus 41, ball bearing 45 for journaling pulley 47 includes an inner ring 91 fixedly fitted on the outer periphery of bearing support portion 44, an outer ring 93 arranged on the outer periphery thereof and a plurality of balls 95 interposed between outer ring 93 and inner ring 91. A metal ring 97 is fixedly fitted on the inner peripheral surface of synthetic resin pulley 47. Outer ring 93 of ball bearing 45 is press-fitted into metal ring 97.

Figure 2:
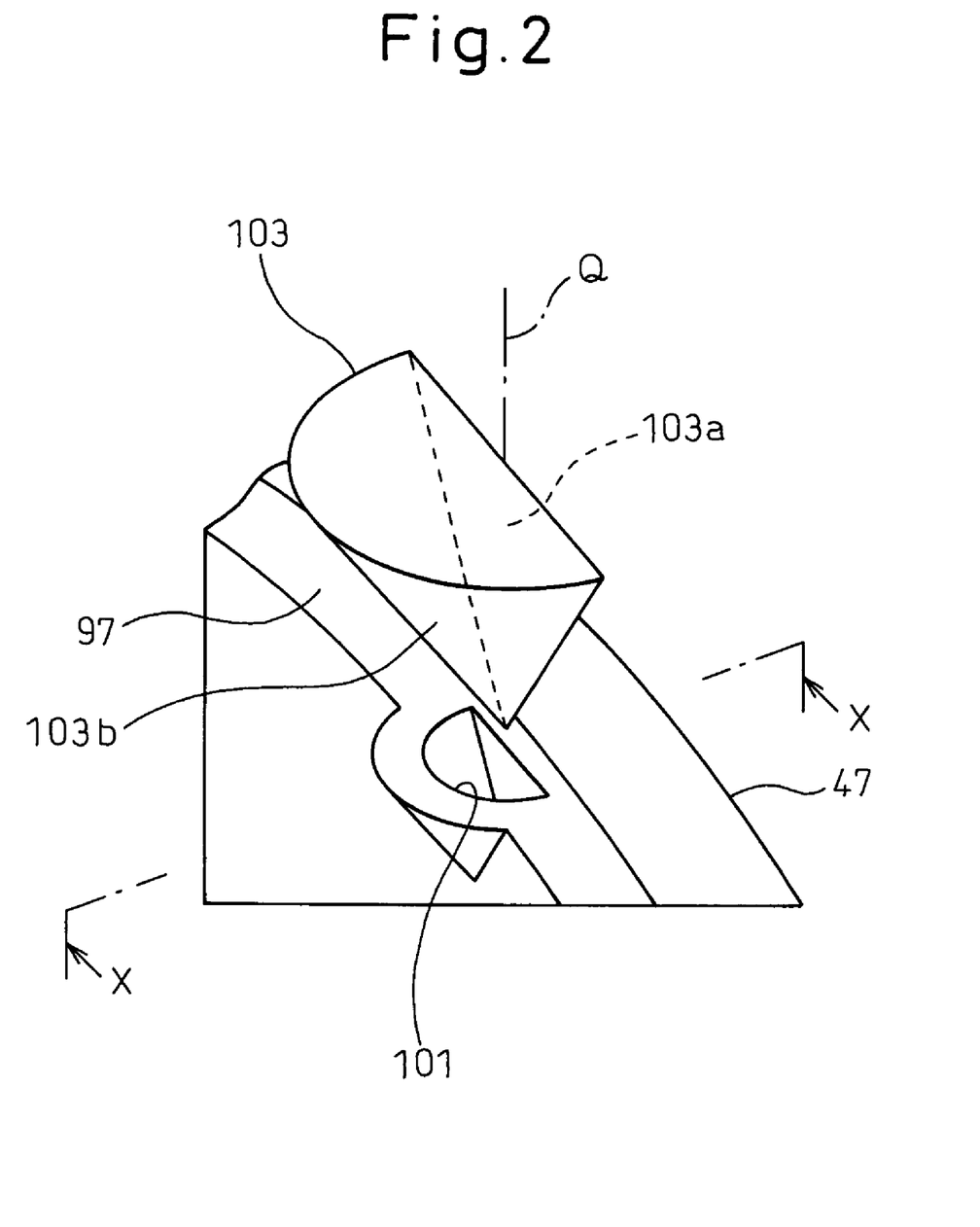
FIG. 2 is a perspective view showing the state in which the end surface of the ring fitted on the pulley is caulked by punching the power transmission apparatus shown in FIG. 1.
Figure 3:
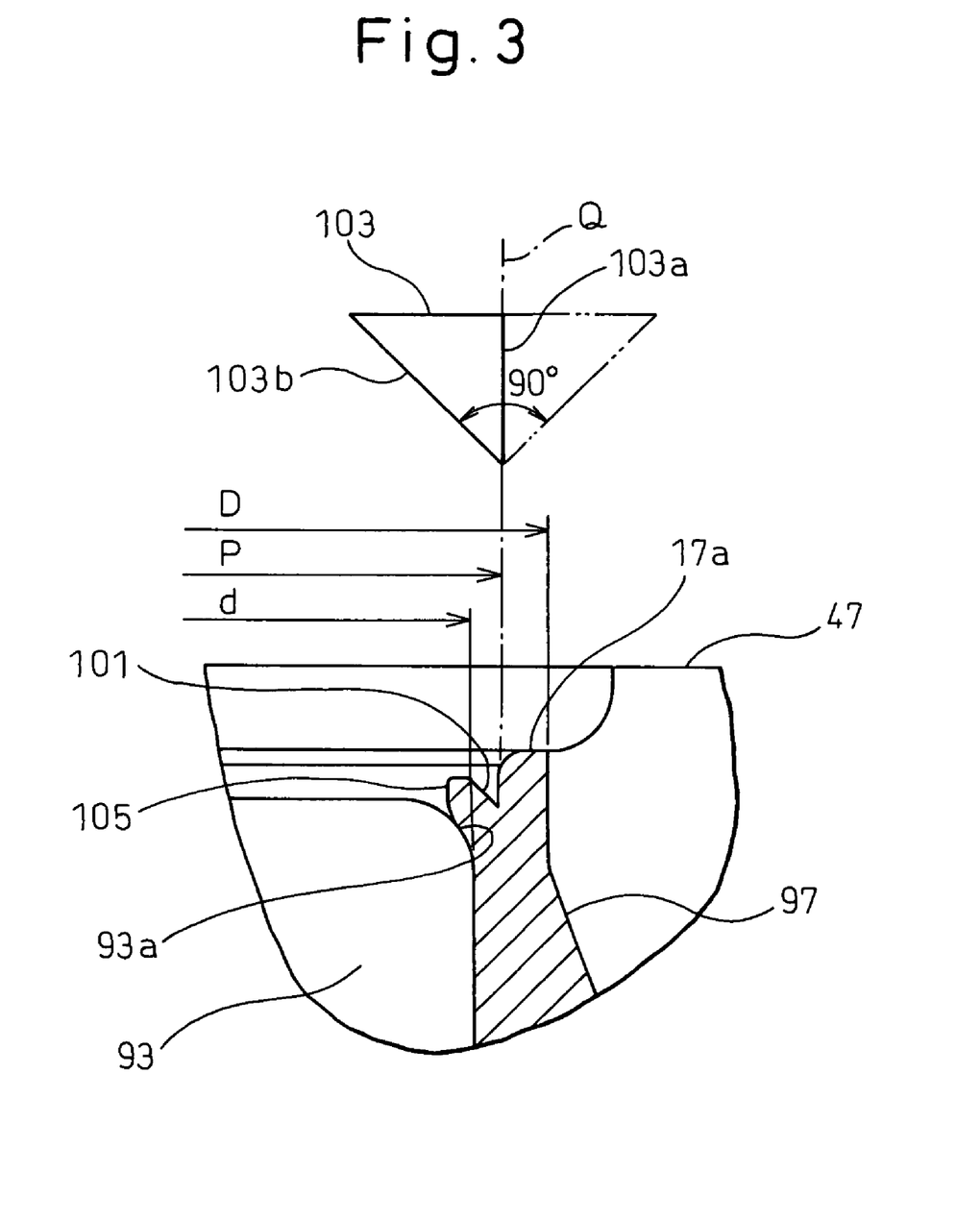
FIG. 3 is a sectional view taken along line X-X in FIG. 2.
Figure 4:
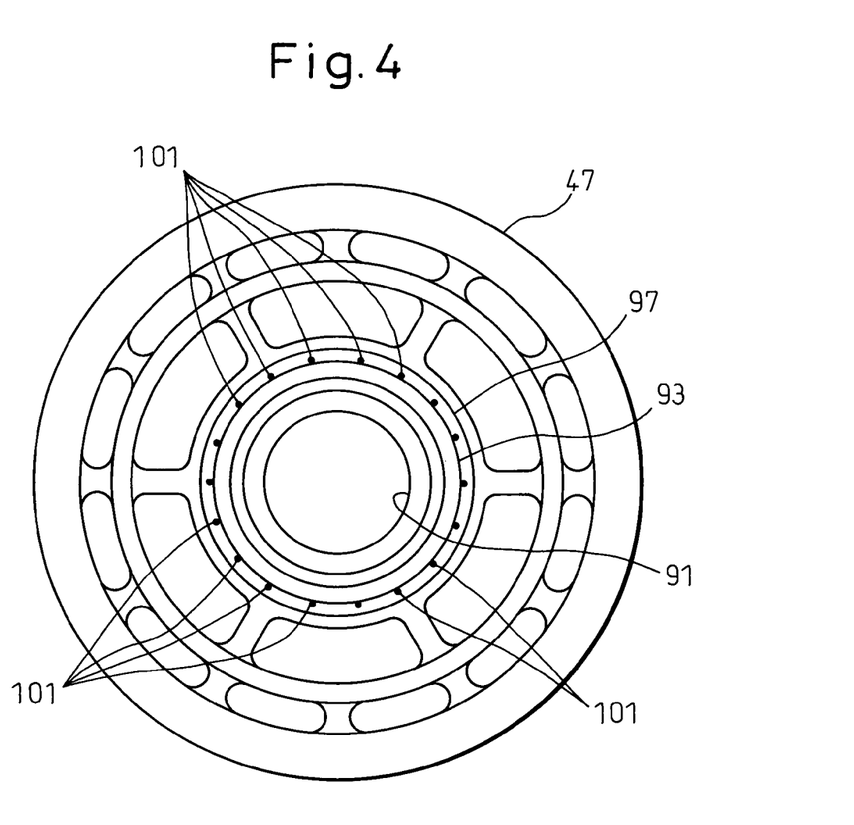
FIG. 4 is an axial side view showing the state in which the pulley and the ball bearing are assembled in the power transmission apparatus shown in FIG. 1.
Figure 5:
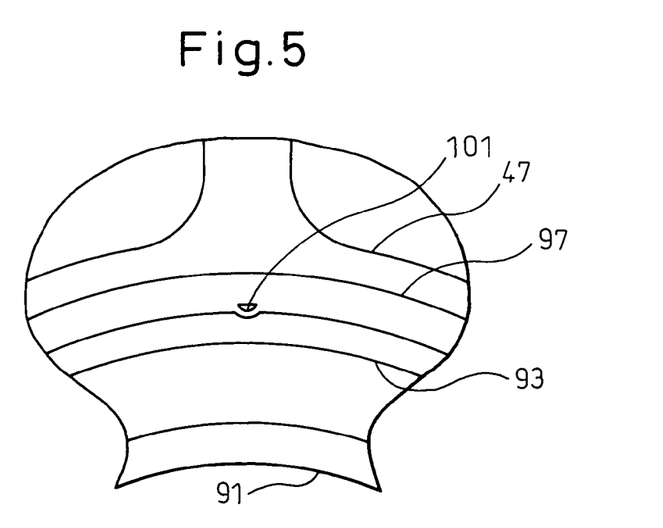
FIG. 5 is an enlarged view of the part caulked by punching in FIG. 4.

Front-side end surface 97a of metal ring 97 press-fitted with outer ring 93 of ball bearing 45, as shown in FIG. 4, is formed with punched holes 101 at 18 points equidistantly along the peripheral direction. These punched holes 101 are formed using a punch 103 as shown in FIGS. 2 and 3. Punch 103 is formed in a semicircular cone with a tip angle of 90° having a progressively increased diameter from rear to front side. Outer surface 103a of pulley 47 side of punch 103 is formed right flat along longitudinal axis Q of the semicircular cone, while inner surface 103b on outer ring 93 side of punch 103 is formed as a conical surface with longitudinal axis Q as a center.

Figure 6:
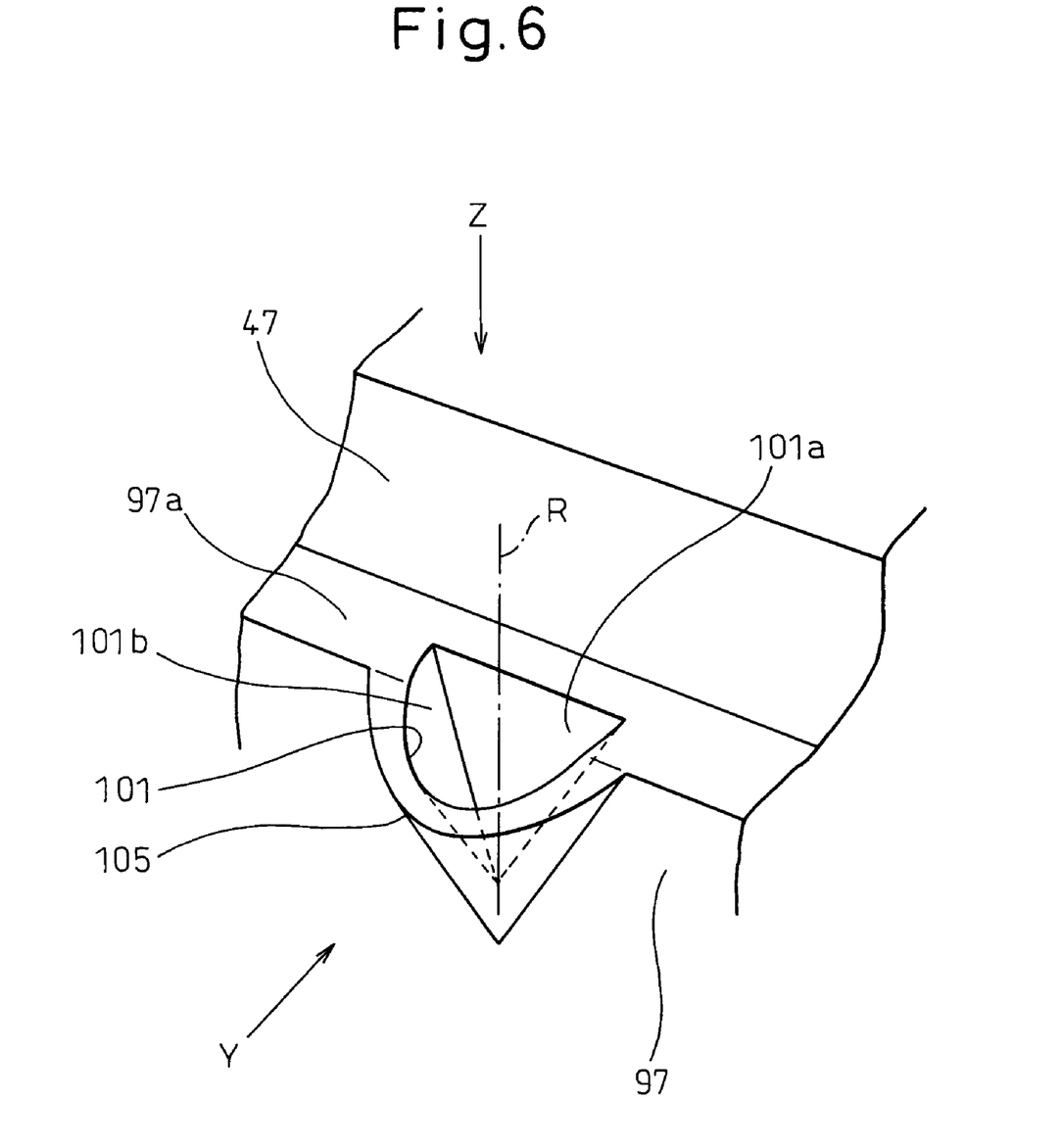
FIG. 6 is a perspective view showing the actual state in which the end surface of the pulley ring is caulked by punching.
Figure 8:
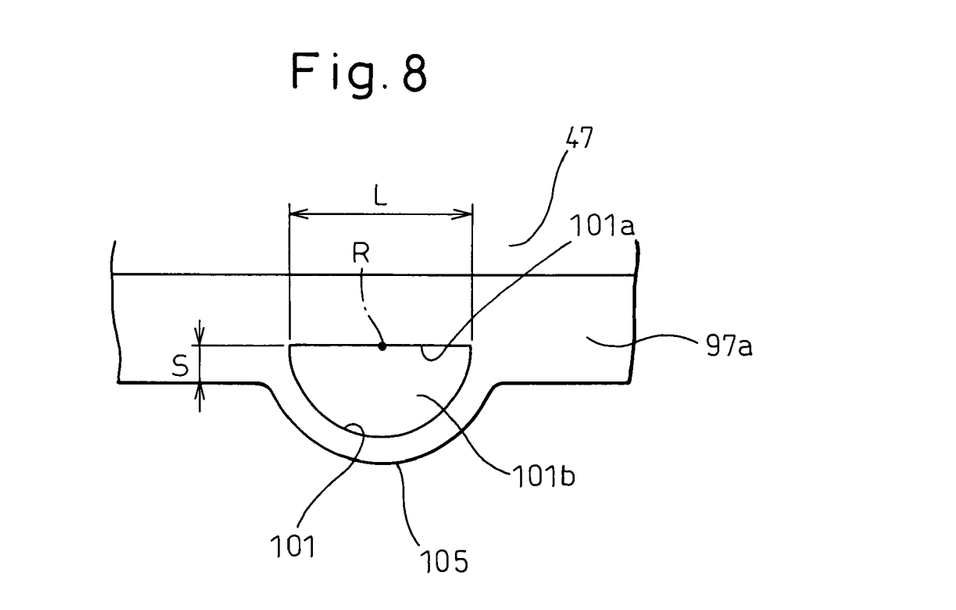
FIG. 8 is a view taken along the direction indicated by arrow Z in FIG. 6.

Punch 103 is located on caulking pitch diameter P larger than inner diameter d and smaller than outer diameter D of front-side end surface 97a of metal ring 97, and pressed against front-side end surface 97a. Then, as shown in FIG. 6, conical inner surface 101b of punched hole 101 is formed by conical inner surface 103b of punch 103, and right flat outer surface 101a of punched hole 101 is formed by right flat outer surface 103a of punch 103. Forward end portion 97b of metal ring 97 closer to the inner periphery than inner surface 103b is projected toward the inner periphery by conical inner surface 103b of punch 103 thereby to form a caulked portion 105. Caulked portion 105 fixedly caulks front-side outer peripheral portion 93a of outer ring 93. Specifically, longitudinal axis Q of punch 103 and longitudinal axis R of punched hole 101, as shown in FIG. 8, are located radially outside of the inner peripheral surface of front-side forward end surface 97a of metal ring 97 by S, which is preferably ranged from 0.3 mm to 0.5 mm. Inner diameter L in peripheral direction of the opening of punched hole 101 is preferably ranged from 1.2 mm to 1.6 mm.

Figure 7:
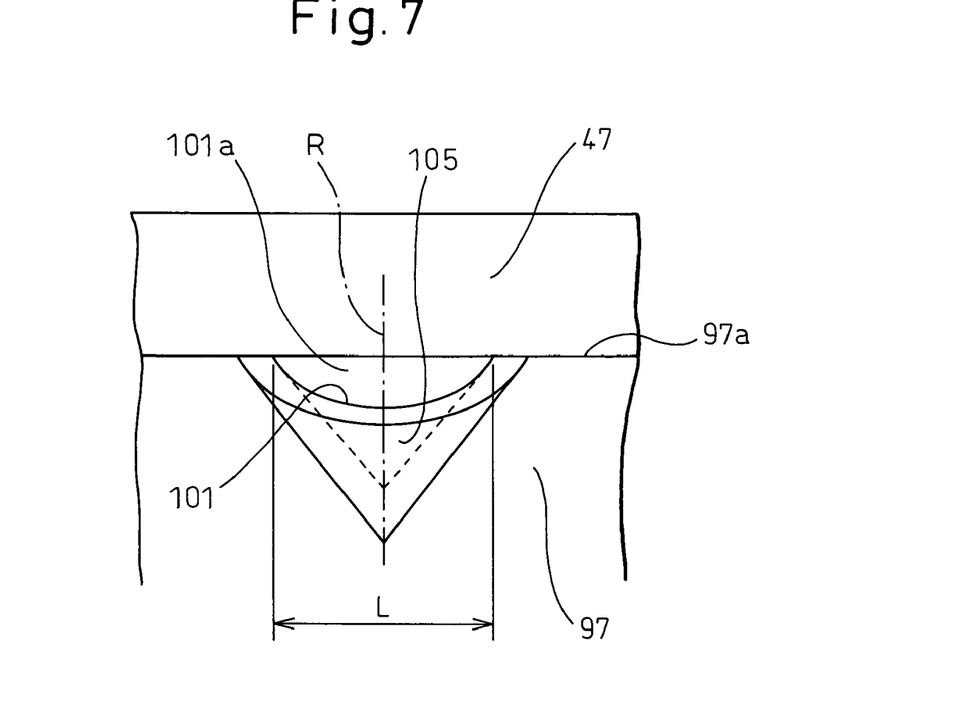
FIG. 7 is a view taken along the direction indicated by arrow Y in FIG. 6.

Punched hole 101 is actually pressed rearward by punch 103, and therefore caulked portion 105 assumes a shape retreated rearward as shown in FIG. 6. FIG. 7 is a view of the state of FIG. 6 from radially inside, and FIG. 8 a view of the state of FIG. 6 taken from front side in axial direction.

As described above, in power transmission apparatus 41, outer ring 93 of the ball bearing is press-fitted into the inner periphery of metal ring 97, and punch 103 having a progressively increased cross-sectional area from the rear side to the front side is forcibly pushed into front-side end surface 97a of metal ring 97 thereby to form a plurality of punched holes 101. The portion of metal ring 97 nearer to the inner periphery than punch 103 is pushed radially inward thereby to form caulked portion 105, and outer ring 93 is fixed by caulking. In the neighborhood of the small-diameter forward end portion of punch 103, i.e. the bottom portion of each punched hole 101, therefore, the radially inward plastic deformation of metal ring 97 is small in amount. As a result, outer ring 93 is not excessively pressed, and the roundness of ball track surface 93b is not adversely affected by the bending stress exerted on outer ring 93. In the neighborhood of the large-diameter rear end portion of punch 103, i.e. the open edge of punched hole 101, on the other hand, metal ring 97 is plastically deformed radially inward to a considerable degree. Thus, front-side outer peripheral portion 93a of outer ring 93 can be caulked into deep engagement, thereby preventing outer ring 93 from being displaced in axial direction.

In the case where pulley 47 is formed of synthetic resin, the fact that punch 103 is formed with right flat outer surface 103a along longitudinal axis Q on pulley 47 side thereof does not substantially deform the portion of metal ring 97 nearer to pulley 47 side than punch 103, and therefore synthetic resin pulley 47 is prevented from cracking or the like defect. In view of the fact that conical inner surface 103b with the radius thereof from longitudinal axis Q progressively increased toward front side from rear side, the portion of metal ring 97 nearer to outer ring 93 than punch 103 can be deformed in either peripheral direction of the metal ring. Therefore, even if punch 103 is pushed into the depth rather excessively, the metal portion can be relieved in the peripheral direction. Thus, the roundness of the ball track surface is not adversely affected by excessive pressure on the outer ring 93.

The caulking operation by punch 103 is performed at 18 points equidistantly in the peripheral direction on front-side end surface 97a of metal ring 97, and therefore front-side outer peripheral portion 93a of outer ring 93 can be uniformly caulked in peripheral direction. As a result, the roundness of the ball track surface can be maintained to a satisfactory degree.

According to the aforementioned embodiment, the punch is assumed to have a conical surface as an example. Nevertheless, the invention is not limited to this configuration, and a pyramidal surface can alternatively be employed.

The aforementioned embodiment represents a case in which pulley 47 is used as a wheel. However, the invention is not limited to this constitution, and a belt wheel or sprocket can of course be employed as an alternative with equal effect.

Further, although the ball bearing is used above as an example of a rolling bearing, a roller bearing may alternatively be employed.

Furthermore, in place of the compressor explained above as a driven unit, the power generator or the like can also be used with equal effect.

While the invention has been described by reference to specific embodiments chosen for purposes of illustration, it should be apparent that numerous modifications could be made thereto by those skilled in the art without departing from the basic concept and scope of the invention.

The invention claimed is:

1. A method fabricating a power transmission apparatus, the apparatus comprising:
    a bearing support portion arranged on a driven unit;
    an input shaft arranged inside the bearing support portion;
    a wheel journalled on the outer periphery of the bearing support portion through a rolling bearing and rotationally driven by a drive source; and
    a power transmission device interposed between the wheel and the input shaft for coupling the wheel and the input shaft to each other; wherein a cylindrical metal ring is fitted on the inner periphery of the wheel,
    the method fabricating the power transmission apparatus comprising the steps of:
    press-fitting an outer ring of the rolling bearing into the inner periphery of the metal ring;
    pushing a distal end of a punch, which has a progressively increasing cross-sectional area from the distal end of the punch to a proximal end of the punch, into a front-side end surface of the metal ring in a rearward direction of the power transmission apparatus to form punched holes, while at the same time the parts of the metal ring nearer to the inner periphery than the punch are pushed radially inward by the punch to form caulked portions, to fixedly caulk the outer ring,
    wherein, the punch has:
    a conical surface, which is on a side of the punch that is near to the rolling bearing, along a longitudinal axis of the punch, when the punch is in a position to form the punched holes, wherein the conical surface is defined such that a radius extending from the longitudinal axis of the punch progressively increases from the distal end of the punch to the proximal end of the punch, and wherein the conical surface is part of a circular conical surface; and a flat surface along the longitudinal axis of the punch on a side of the punch near to the wheel, when the punch is in the position to form the punched holes, and wherein each punched hole has: a conical surface, which is on a side of the punched hole that is near to the rolling bearing, along a longitudinal axis of the punched hole, wherein the conical surface is defined such that a radius extending from the longitudinal axis of each punched hole progressively increases from a rear end to a front end of the punched hole, and wherein the conical surface is part of a circular conical surface; and a flat surface along the longitudinal axis of the punched hole on a side of the punched hole near to the wheel.

2. The method of fabricating the power transmission apparatus according to claim 1, wherein the wheel is formed of synthetic resin.

3. The method of fabricating the power transmission apparatus according to claim 1, wherein the punched holes are formed using the punch with the chord of the arcuate section of the punch directed toward the outer periphery.

4. The method of fabricating the power transmission apparatus according to claim 1, wherein the caulking operations with the punch are performed at equal angular intervals of 30 degrees on the front-side end surface of the metal ring.

5. A power transmission apparatus comprising:
a bearing support portion arranged on a driven unit;
an input shaft arranged inside the bearing support portion;
a wheel journalled on the outer periphery of the bearing support portion through a rolling bearing and rotationally driven by a drive source; and
a power transmission device interposed between the wheel and the input shaft for coupling the wheel and the input shaft to each other,
wherein a cylindrical metal ring is fitted on the inner periphery of the wheel,
wherein an outer ring of the rolling bearing is press-fitted into the inner periphery of the metal ring;
wherein punched holes, each having a progressively increasing cross-sectional area from a rear end to a front end, are formed by pushing a punch in a rearward direction of the power transmission apparatus into a front-side end surface of the metal ring, while parts of the metal ring nearer to the inner periphery than the punch are pushed radially inward to form caulked portions, to fixedly caulk the outer ring, and
wherein each punched hole has:
a conical surface, which is on a side of the punched hole that is near to the rolling bearing, along a longitudinal axis of the punched hole, wherein the conical surface is defined such that a radius extending from the longitudinal axis of each punched hole progressively increases from a rear end to a front end of the punched hole, and wherein the conical surface is part of a circular conical surface; and
a flat surface along the longitudinal axis of the punched hole on a side of the punched hole near to the wheel.

6. The power transmission apparatus according to claim 5, wherein the wheel is formed of synthetic resin.

7. The power transmission apparatus according to claim 5, wherein the chord of the circular segment forming the punched hole is directed toward the outer periphery.

8. The power transmission apparatus according to claim 5, wherein the punched holes are spaced at equal angular intervals of 30 degrees on the front-side end surface of the metal ring.

9. The power transmission apparatus according to claim 6, wherein the longitudinal axis of the conical surface of the punched hole is located within the range of 0.3 mm to 0.5 mm radially outward of the inner peripheral surface of the metal ring.

10. The power transmission apparatus according to claim 6, wherein the peripheral length of the punched hole is within the range of 1.2 mm to 1.6 mm.

11. The method according to claim 1, wherein the bearing support portion is projected from a housing of the driven unit, and wherein when viewed from the housing in the axial direction of the input shaft, the power transmission device is disposed on the front side, and the rear side is opposed to the front side.

12. The power transmission apparatus according to claim 5, wherein the bearing support portion is projected from a housing of the driven unit, and wherein when viewed from the housing in the axial direction of the input shaft, the power transmission device is disposed on the front side, and the rear side is opposed to the front side.

13. A power transmission apparatus comprising:
a bearing support portion arranged on a driven unit;
an input shaft arranged inside the bearing support portion;
a pulley journalled on an outer surface of the bearing support portion through a rolling bearing, wherein the pulley is adapted to by rotationally driven by a drive source; and
a power transmission device located between the wheel and the input shaft for coupling the wheel and the input shaft to each other,
a cylindrical metal ring fitted on an inner surface of the pulley, wherein an outer ring of the rolling bearing is press-fitted to an inner surface of the metal ring, wherein the cylindrical metal ring has a front end and a rear end, and the rear end of the metal ring faces the driven unit;
punched holes formed in a front end surface of the metal ring, wherein each punched hole has:
a progressively increasing cross-sectional area from a rear end to a front end of each punched hole in the axial direction of the metal ring, and parts of the metal ring that are located radially inward of each punched hole are deformed in a radially inward direction of the metal ring to form caulked portions for fixing the metal ring to the outer ring of the rolling bearing,
a conical surface, which is on a side of the punched hole that faces radially inward toward the rolling bearing, wherein the conical surface extends along a longitudinal axis of the punched hole, and the conical surface is defined such that a radius extending from the longitudinal axis of each punched hole progressively increases from a rear end to a front end of the punched hole, and further wherein the conical surface is defined as a part of a circular conical surface; and
a flat surface that extends generally in the axial direction of the metal ring, is opposed to the conical surface and faces in a radially outward direction of the metal ring.

* * * * *